United States Patent [19]

Uemura et al.

[11] Patent Number: 5,266,358
[45] Date of Patent: Nov. 30, 1993

[54] METHOD OF FORMING WATER-REPELLENT METAL OXIDE FILM COATED ON GLASS SUBSTRATE

[75] Inventors: Ryuzo Uemura, Miura; Toshikazu Nishide, Sagamihara; Ichiro Nakamura, Yokosuka, all of Japan

[73] Assignee: Nissan Motor Company, Ltd., Yokohama, Japan

[21] Appl. No.: 892,317

[22] Filed: Jun. 2, 1992

[30] Foreign Application Priority Data

Jun. 5, 1991 [JP] Japan .................... 3-159955

[51] Int. Cl.$^5$ ............................... B05D 3/02
[52] U.S. Cl. .................. 427/376.2; 427/226; 427/387; 427/397.7
[58] Field of Search .............. 427/163, 165, 168, 169, 427/226, 240, 376.2, 387, 397.7

[56] References Cited

U.S. PATENT DOCUMENTS

| | | | |
|---|---|---|---|
| 4,125,673 | 11/1978 | Roth et al. | 428/447 |
| 4,596,745 | 6/1986 | Chao | 428/428 |
| 4,830,879 | 5/1989 | Debsikdar | 427/162 |
| 4,997,684 | 3/1991 | Franz et al. | 427/384 |
| 5,137,749 | 8/1992 | Yamazaki et al. | 427/108 |

FOREIGN PATENT DOCUMENTS 64-68477 3/1989 Japan .
1-126244 5/1989 Japan .

*Primary Examiner*—Shrive Beck
*Assistant Examiner*—David M. Mairana
*Attorney, Agent, or Firm*—Lowe, Price, LeBlanc & Becker

[57] ABSTRACT

The disclosure relates to a metal oxide film formed on a glass substrate by a sol-gel method using a solution of at least one metal alkoxide or acetylacetonate. Water which is in the amount ranging from 50 to 400 mol % of the at least one metal alkoxide or acetylacetonate, an organic solvent and a catalyst are added to the solution, thereby to form a first sol. To afford water repellency to the oxide film, a fluoroalkylsilane in the amount more than 0.30 mol % of and less than 3.0 mol % of the at least one metal alkoxide or acetylacetonate, or an alkylsilane compound in the amount more than 4.0 mol % of and less than 20 mol % of the at least one metal alkoxide or acetylacetonate, is added to the first sol, thereby forming a second sol. The concentration of the at least one metal alkoxide or acetylacetonate in the second sol is adjusted to fall within the range from 0.005 to 3.0 mol %. The second sol is applied to the glass substrate to form a gel film. The gel film is heated at a temperature not lower than 100° C. The obtained oxide film is superior in durability of water repellency.

17 Claims, No Drawings

METHOD OF FORMING WATER-REPELLENT METAL OXIDE FILM COATED ON GLASS SUBSTRATE

BACKGROUND OF THE INVENTION

1. Field of the Invention

The present invention relates to a method of forming a water-repellent metal oxide film coated on a glass substrate by a sol-gel method using a solution of a metal alkoxide or acetylacetonate.

2. Description of the Prior Art

It is well known to coat a glass plate surface with a hard and abrasion-resistant film of a metal oxide such as silicon oxide. The metal oxide film can be formed, for example, by a sol-gel method using a solution of an organic metal compound such as a metal alkoxide or acetylacetonate. When the film-coated glass plate is used, for example, as a vehicular window glass, it is desired that the film be repellent to water.

JP-A (Patent) 64-68477 discloses a method of forming a water-repellent metal oxide film coated on a steel sheet. In this method, first, at least 0.005 wt % of at least one organic metal compound selected from the group consisting of simple alkoxides having no organic group other than alkoxyl group, monomethyl alkoxides and acetylacetonate of Al, Zr, Ti, Si, W, Ce, Sn and Y, and fluoroalkylsilane amounting to 0.005 to 0.30 mol % of the organic metal compound, are dissolved in an alcohol solution. Then, the sheet is coated with the solution. Then, the coated sheet is heated at a temperature not lower than 100° C., thereby forming a metal oxide film which has water repellency. However, this method has the following drawback.

When this method is used to form a metal oxide film coated on a glass plate, water repellency of this film does not last for a long period in the outdoors due to elution of alkali metal ions from the glass plate.

JP-A (Patent) 1-126244 discloses a method of forming a water-repellent film coated on a glass plate. In this method using a dip coating, first, the glass plate is dipped in a solution consisting of polydimethylsiloxane and a hydrocarbon which takes the form of liquid at room temperature. Then, the glass plate is pulled up, and heated at a temperature in the range from 250° to 300° C. for 10 to 30 min, thereby forming a film which has water repellency on the glass plate. However, this method has the following drawback.

Water repellency of this film is impaired in the outdoors in a relatively short time due to an insufficient thickness of the film.

SUMMARY OF THE INVENTION

It is therefore an object of the present invention to provide an improved method of forming a water repellent metal oxide film coated on a glass substrate, which method allows the film to have a durable water repellency in the outdoors.

According to the present invention, there is provided a method of forming the above stated water-repellent metal oxide film comprising the steps of: (i) mixing a first solution of at least one metal oxide precursor selected from the group consisting of metal alkoxides and metal acetylacetonates, with an organic solvent and water which is in the amount ranging from 50 to 400 mol % of the at least one metal oxide precursor, thereby forming a first sol through hydrolysis and polycondensation of the at least one metal oxide precursor; (ii) adding one organic compound selected from the group consisting of: fluoroalkylsilane compounds in the amount more than 0.30 mol % of and less than 3.0 mol % of the at least one metal oxide precursor, and alkylsilane compounds in the amount more than 4.0 mol % of and less than 20 mol % of the at least one metal oxide precursor, to the first sol, thereby forming a second sol containing the one organic compound, the concentration of the at least one metal oxide precursor in the second sol being adjusted in the range from 0.005 to 3.0 mol %; (iii) applying the second sol to the glass substrate, thereby to form a gel film on the glass substrate; and (iv) heating the gel film at a temperature not lower than 100° C.

DESCRIPTION OF THE PREFERRED EMBODIMENTS

According to the present invention, there is provided a method of forming a water repellent metal oxide film coated on a glass substrate. In this method, first, a metal alkoxide is mixed with an organic solvent. Then, water and a catalyst are added to the mixed solution. Then, the solution is heated at a first predetermined temperature to accelerate hydrolysis and polycondensation of the alkoxide, thereby forming a sol which is to serve as a vehicle of a water-repellent agent, through the formation of Si—O—Si bond. Then, the water-repellent agent such as fluoroalkylsilane or alkylsilane is added to the vehicle, thereby forming a coating solution. Then, a glass substrate is coated with the coating solution by a suitable coating method. Then, during a drying process of the sol film coated on the glass substrate, it transforms into a gel film. Then, the gel film on the glass substrate is heated at a second predetermined temperature. By this heating, the gel film turns into a dense and hard metal oxide film through a so-called dehydrocondensation, i.e. condensation with elimination of water, and through cross linking. This metal oxide film has water repellency because of use of fluoroalkylsilane or alkylsilane.

The general formula of metal alkoxide is $M(OR)_n$, wherein "M" and "R" represent a metal and an alkyl group. As this metal, it is preferable to use Si, Ti, Al, Zr, W, Ce, Sn or the like, which usually makes the oxide film transparent. However, an alkali metal and an alkali earth metal are not suitable for this metal. A metal acetylacetonate can substitute for the metal alkoxide. The metal alkoxide may be either a simple alkoxide having no organic group other than alkoxyl group, such as methoxide, ethoxide, isopropoxide or butoxide, or an alkyl alkoxide having at least one alkyl group besides alkoxyl group, such as a monomethylalkoxide or a monomethylalkoxide. As the monomethylalkoxide, it is usual to use monomethylmethoxide, monomethylethoxide, monomethylisopropoxide, or monomethyl-n-buthoxide. As metal acetylacetonate, it is usual to use acetylacetonate zirconium, acetylacetonatetitanium, or acetylacetonateyttrium. It is optional to form a film of a mixed oxide of two kinds of metals by using a mixed solution of an alkoxide or acetylacetonate of one metal and an alkoxide or acetylacetonate of the other metal.

In the coating solution, the concentration of metal alkoxide is adjusted so as to fall within the range from 0.005 to 3.0 mol/l. If the concentration is above 3.0 mol/l, pot life, i.e. usable period, of the coating solution is shortened. Therefore, it can not be stored for a long time. Furthermore, the solution becomes too viscous and hence the oxide film becomes too thick. With this, the oxide film tends to have cracks or to be exfoliated from the glass substrate. If the concentration is below 0.005 mol/l, the oxide film becomes too thin. Thus, it is necessary to coat the glass substrate with the coating solution several times. This increases the production cost.

It is optional to mix a ligand with the metal alkoxide for adjusting hydrolysis rate of the metal alkoxide. As the ligand, it is preferred to use a diketone such as acetylacetone, an alcohol ether such as ethyl cellosolve. It is more preferred to use an glycol such as ethylene glycol, hexylene glycol, 2,3-butanediol, 1,2-propandiol, or 2-methyl-1,2-propanediol.

It is preferred to add fluoroalkylsilane to the vehicle, in the amount more than 0.30 mol % of and less than 3.0 mol % of the metal alkoxide. If the amount is not more than 0.30 mol %, the metal oxide film is not provided with a sufficient water repellency. If the amount is not less than 3.0 mol %, the metal oxide film would have a white color.

It is preferred to add alkylsilane to the vehicle, in the amount more than 4.0 mol % of and less 20 mol % of the alkoxide. If the amount is not more than 4.0 mol %, the metal oxide film is not provided with a sufficient water repellency. If the amount is not less than 20 mol %, crawling of the coating solution tends to occur upon the coating process. With this, it is difficult to form a uniform oxide film on the glass substrate.

As the fluoroalkylsilane, it is usual to use, for example, $CF_3CH_2CH_2Si(Me)_3$, $CF_3CH_2CH_2SiCl_3$, $CF_3(CF_2)_5CH_2CH_2SiCl_3$,
$CF_3(CF_2)_5CH_2CH_2Si(OMe)_3$,
$CF_3(CF_2)_7CH_2CH_2SiCl_3$,
$CF_3(CF_2)_7CH_2CH_2Si(OMe)_3$,
$CF_3(CF_2)_7CH_2CH_2SiMeCl_2$, or
$CF_3(CF_2)_7CH_2CH_2SiMe(OMe)_2$.

As the alkylsilane, it is usual to use, for example, $SiC_6H_{15}Cl$, $SiC_3H_8Cl_2$, $SiC_4H_9Cl_3$, $SiC_4H_{10}Cl_2$, $SiC_{12}H_{10}Cl_2$, $SiC_{16}H_{20}O_2$, $SiC_{14}H_{16}O_2$, $SiC_9H_{22}O_3$, $SiC_7H_{18}O_3$, $SiC_4H_{12}O_3$, $SiC_{13}H_{13}Cl$, $SiC_7H_8Cl_2$, $SiC_{20}H_{43}Cl$, $SiC_{19}H_{40}Cl$, $SiC_{21}H_{46}O_2$, $SiC_{18}H_{37}Cl_3$, $SiC_{24}H_{52}O_3$, $SiC_{21}H_{46}O_3$, $SiC_6H_{15}Cl_3$, $SiC_{12}H_{20}O_3$, $SiC_9H_{14}O_3$, $SiC_{18}H_{15}Cl$ or $SiC_9H_{21}Cl$. p As the organic solvent serving to uniformly dispersing therein the metal alkoxide and the water-repellent agent, it is preferred to use a lower alcohol such as methanol, ethanol, propanol or buthanol. However, an aromatic hydrocarbon such as toluene or xylene can be used, too.

In this invention, water is added to hydrolyze metal alkoxide. The amount of water is adjusted to fall within the range from 50 to 400 mol % of the metal alkoxide. If the amount is more than 400 mol %, pot life of the coating solution is shortened, thereby not permitting the same to be stored for a long time. If the amount is lower than 50 mol %, crawling of the coating solution on the glass substrate tends to occur or the oxide film tends to be exfoliated from the glass substrate.

As the catalyst serving to accelerate hydrolysis of the metal alkoxide, it is usual to use an acid such as hydrochloric acid, hydrofluoric acid, nitric acid, acetic acid or formic acid.

As the coating method, it is usual to use dip coating, spin coating or spraying. Thickness of the film on the glass substrate in a dried condition is adjusted to be more than 0.03 $\mu m$, and more preferably from 0.05 to 0.5 $\mu m$.

Heating of the coated glass substrate is conducted at a temperature not lower than 100° C. If the temperature is lower than 100° C., dehydrocondensation and cross linking become insufficient. Thus, durability of the metal oxide film is impaired. In case that fluoroalkylsilane is used, the glass substrate coated with the film is heated preferably at a temperature which is not lower than 100° C. and is lower than the decomposition temperature of fluoroalkylsilane, and more preferably at a temperature from 300° to 420° C. In case that alkylsilane is used, the coated glass substrate is heated preferably at a temperature which is not lower than 100° C. and is lower than the boiling point of alkylsilane, and more preferably at a temperature from 150° to 170° C.

EXAMPLE 1

Soda-lime glass plates were used as the glass substrate. The glass plates were immersed for one day in a 5% solution of a glass substrate detergent, Hikari-Ace, which is a trade name and produced by Hikari Kogyo Co., Ltd. Then, the glass plates were washed first by tap water, and then by pure water. Then, the glass plates were washed with ethanol to dry the same.

In this example, three different coating solutions A, B and C were prepared, thereby forming three different metal oxide films A, B and C coated on the glass plates. The coating solution A was prepared according to the following method.

First, 50 ml of tetraethoxysilane as a metal alkoxide was mixed with 50 ml of ethanol. Then, 4.3 ml of water and 5.7 ml of 61% nitric acid solution were added to the mixture solution. Then, the solution was heated in a water bath at a temperature of 80° C. for 2 hr, thereby hydrolyzing tetraethoxysilane to form a vehicle. After cooling the vehicle, 0.63 g of $CF_3(CF_2)_7CH_2CH_2Si(OMe)_3$ as a fluoroalkylsilane was added to the same, thereby forming the coating solution A.

The coating solution B was prepared according to the following method.

First, a vehicle was prepared in the same manner as that of the coating solution A. Then, 0.24 g of $CF_3CH_2CH_2Si(OMe)_3$ as a fluoroalkylsilane was added to the vehicle, thereby forming the coating solution B.

The coating solution C was prepared according to the following method.

First, a vehicle was prepared in the same manner as that of the coating solution A. Then, 0.52 g of $CF_3(CF_2)_5CH_2CH_2Si(OMe)_3$ as a fluoroalkylsilane was added to the the vehicle, thereby forming the coating solution C.

The amounts of fluoroalkylsilane and water relative to the alkoxide, and the concentration of the alkoxide in the coating solution, expressed as mol %, with respect to the coating solutions A, B and C are respectively shown in Table 1.

The glass plates were respectively coated with the thus prepared coating solutions A, B and C by the following spin coating method.

First, the glass plate was set on a spinner. Then, each coating solution in the amount from 2 to 3 ml was dropped to the glass plate while the glass plate was kept rotated at 3000 rpm. The rotation was kept for 30 sec. after the dropping, thereby forming a sol film on the glass plate by centrifugal force. Then, the film was dried for 30 min at room temperature, thereby forming a gel film. Then, the film-coated glass plate was heated in a furnace at a temperature of 380° C. for 30 min with a temperature rising rate of 8° C./min, thereby forming a transparent metal oxide film on the glass plate.

EXAMPLE 2

This example is a modification of Example 1. Alkysilane was used as a water-repellent agent in stead of fluoroalkylsilane of Example 1.

Soda-lime glass plates were washed and dried in the same manner as that of Example 1.

In this example, three different coating solutions D, E and F were prepared, thereby forming three different metal oxide films D, E and F. The coating solution D was prepared according to the following method.

First, 12.5 ml of tetraethoxysilane and 8 ml of hexylene glycol were dissolved in 50 ml of ethanol. The solution was heated in a water bath at a temperature of 80° C. for 1.5 hr. Then, the temperature was lowered to 40° C. Then, 1 ml of water and 1.5 ml of 61% nitric acid solution were added to the solution, and then the temperature was raised to and maintained at 80° C. for 1.5 hr, thereby hydrolyzing tetraethoxysilane to form a vehicle. Then, 0.58 g of $SiC_9H_{22}O_3$ as an alkylsilane was added to the vehicle, thereby forming the coating solution D.

The coating solution E was prepared according to the following method.

A vehicle was prepared in the same manner as that of the coating solution D. Then, 1.0 g of $SiC_{21}H_{46}O_2$ as an alkylsilane was added to the vehicle, thereby forming the coating solution E.

The coating solution F was prepared according to the following method.

A vehicle was prepared in the same manner as that of the coating solution D. Then, 1.16 g of $SiC_{24}H_{52}O_3$ as an alkylsilane was added to the vehicle, thereby forming the coating solution F.

The amounts of alkylsilane and water relative to the alkoxide, and the concentration of the alkoxide in the coating solution, expressed as mol %, with respect to the coating solutions D, E and F are respectively shown in Table 1.

The glass plates were respectively coated with the coating solutions D, E and F by the same spin coating method as that of Example 1. Then, the film-coated glass plate was heated in a furnace at a temperature of 150° C. for 30 min with a temperature rising rate of 8° C./min, thereby forming a transparent metal oxide film on the glass plate.

The following Comparative Examples 1–6 are modifications of Example 1.

COMPARATIVE EXAMPLE 1

This comparative example is a modification of Example 1 with respect to the composition of coating solution, the coating method and the heating temperature. In this comparative example, the metal alkoxide, water and the catalyst were omitted. In this comparative example, three different coating solutions G, H and I were prepared, thereby forming three different films G, H and I.

The coating solution G, H or I was prepared in a manner to dissolve 3 wt % of the fluoroalkylsilane of the coating solution A, B or C of Example 1 in ethanol, respectively.

Glass plates prepared in the same manner as those of Example 1 were respectively coated with the coating solutions G, H and I by the following dip coating method.

First, the glass plate was immersed in the coating solution G, H or I for 30 min. Then, the glass plate was pulled up, and heated in a furnace at a temperature of 120° C. for 30 min, thereby forming a film on the glass plate.

COMPARATIVE EXAMPLE 2

This comparative example is a modification of Example 1 with respect to the concentration of fluoroalkylsilane.

First, 4.43 g of $CF_3(CF_2)_7CH_2CH_2Si(OMe)_3$ as a fluoroalkylsilane was added to a vehicle which was prepared in the same manner as that of Example 1, thereby preparing a coating solution. Then, the glass plate was coated with the coating solution by the same spin coating of Example 1. The film-coated glass plate was dried at room temperature for about 30 min. With this, the coated film undesirably had a white color.

COMPARATIVE EXAMPLE 3

The process of preparing the coating solution A of Example 1 was repeated except that 2 ml of ethanol was mixed with 50 ml of tetraethoxysilane. Then, the spin coating and the drying process of Example 1 were repeated. With this, a transparent film coated on the glass plate was obtained. Then, the glass plate was heated at 350° C. for 30 min with a temperature rising rate of 8° C./min. With this, the film was exfoliated from the glass plate.

COMPARATIVE EXAMPLE 4

The process of preparing the coating solution A of Example 1 was repeated except that 9.0 ml of water and 16.7 ml of 61% nitric acid solution were added to the mixture solution of 50 ml of tetraethoxysilane and 50 ml of ethanol. Then, the spin coating and the drying process of Example 1 were repeated. With this, a transparent film coated on the glass plate was obtained. Then, the heating process of Comparative Example 3 was repeated. With this, the film was exfoliated from the glass plate.

COMPARATIVE EXAMPLE 5

The process of preparing the coating solution A of Example 1 was repeated except that 0.25 g of $CF_3(CF_2)_7CH_2CH_2Si(OMe)_3$ as a fluoroalkylsilane was added to the vehicle. Then, the spin coating and the drying process of Example 1 were repeated. With this, a transparent film coated on the glass plate was obtained. Then, the heating process of Comparative Example 3 was repeated, thereby forming a metal oxide film coated on the glass plate.

COMPARATIVE EXAMPLES 6

The process of preparing the coating solution A of Example 1 was repeated except that only the nitric acid solution in the amount of 2.24 ml was added to the mixture solution, instead of adding water and the nitric acid solution. Then, the spin coating and the drying process of Example 1 were repeated. With this, a transparent film coated on the glass plate was obtained. Then, the heating process of Comparative Example 3 was repeated. With this, the film was exfoliated from the glass plate.

With respect to the coating solutions of Comparative Examples 2–6, the amounts of fluoroalkylsilane and water relative to the alkoxide, and the concentration of the alkoxide in each coating solution, expressed as mol %, are respectively shown in Table 1.

On each of the metal oxide films of Examples 1 and 2 and of Comparative Examples 1 and 5 in which the transparent films formed on the glass plates were obtained, an outdoor exposure test was conducted for 6 months. Contact angle of water drop before and after the exposure test was measured to evaluate durability of water repellency of the films. The results are shown in Table 2. It is understood that the metal oxide films of Examples 1 and 2 are superior in durability of water repellency, as compared with those of Comparative Examples 1 and 5.

TABLE 1

| Coating Solution | Fluoro-alkylsilane Alkoxide (mol %) | Alkylsilane Alkoxide (mol %) | $H_2O$ Alkoxide (mol %) | Alkoxide Coating Solution (mol %) |
|---|---|---|---|---|
| Ex. 1 (A) | 0.50 | — | 184 | 2.0 |
| Ex. 1 (B) | 0.50 | — | 184 | 2.0 |
| Ex. 1 (C) | 0.50 | — | 184 | 2.0 |
| Ex. 2 (D) | — | 5.0 | 180 | 0.75 |
| Ex. 2 (E) | — | 5.0 | 180 | 0.75 |
| EX. 2 (F) | — | 5.0 | 180 | 0.75 |
| Comp. Ex. 2 | 3.50 | — | 184 | 1.95 |
| Comp. Ex. 3 | 0.50 | — | 184 | 3.5 |
| Comp. Ex. 4 | 0.50 | — | 450 | 1.75 |
| Comp. Ex. 5 | 0.20 | — | 184 | 2.0 |
| Comp. Ex. 6 | 0.50 | — | 30 | 2.2 |

TABLE 2

| | Contact Angle (°) | |
|---|---|---|
| | Before Test | After Test |
| Ex. 1 (A) | 110 | 108 |
| Ex. 1 (B) | 110 | 103 |
| Ex. 1 (C) | 110 | 107 |
| Ex. 2 (D) | 103 | 100 |
| Ex. 2 (E) | 103 | 102 |
| Ex. 2 (F) | 103 | 103 |
| Com. Ex. 1 (G) | 110 | 40 |
| Com. Ex. 1 (H) | 110 | 38 |
| Com. Ex. 1 (I) | 110 | 39 |
| Com. Ex. 5 | 60 | 36 |

What is claimed is:

1. A method of forming a water-repellent metal oxide film on a glass substrate, the method comprising the steps of:
   (i) mixing a first solution of
      at least one metal oxide precursor selected from the group consisting of metal alkoxides and metal acetylacetonates with an organic solvent; and
      about 50 to 400 mol %, based on said metal oxide precursor, or water;
      thereby forming a first sol through hydrolysis and polycondensation of said metal oxide precursor;
   (ii) adding to said first solution at least one water-repellency agent selected from the group consisting of:
      about 0.30–3.0 mol % based on said metal oxide precursor of at least one fluoroalkylsilane compound, and
      about 4.0–20 mol % based on said metal oxide precursor of a n alkysilane compound to form a second sol;
   wherein the concentration of said metal oxide precursor in said second sol is therefore adjusted to about 0.005–3.0 mol %;
   (iii) applying said second sol to a glass substrate to form a gel film on the glass substrate; and
   (iv) heating said gel film at a temperature greater than about 100° C.

2. A method according to claim 1, wherein said metal oxide precursor is selected from the group consisting of alkoxides of Si, Ti, Al, Zr, W, Ce, and Sn and acetylacetonatos of Si, Ti, Al, Zr, W, Ce, and Sn.

3. A method according to claim 2, wherein said metal alkoxide comprises a silicon alkoxide.

4. A method according to claim 1, wherein a catalyst is added to said first solution to increase the rate of hydrolysis and polycondensation of said metal oxide precursor.

5. A method according to claim 4, wherein said catalyst comprises an acid compound.

6. A method according to claim 5, wherein said acid compound is at least one selected from the group consisting of hydrochloric acid, hydrofluoric acid, nitric acid, acetic acid and formic acid.

7. A method according to claim 6, wherein said acid compound comprises nitric acid.

8. A method according to claim 1, wherein each of said metal alkoxides comprises an alkyl group selected from the group consisting of methyl, ethyl, isopropyl, propyl and butyl groups.

9. A method according to claim 1, wherein a ligand is added to said first solution to adjust the rate of hydrolysis of said metal oxide precursor.

10. A method according to claim 9, wherein said ligand is selected from the group consisting of a diketone, an alcohol ether and a glycol.

11. A method according to claim 10, wherein said glycol is selected from the group consisting of hexylene glycol, 2,3-butanediol, 1,2-propandiol, and 2-methyl-1,2-propanediol.

12. A method according to claim 1, wherein said fluoroalkylsilane compound is selected from the group consisting of $CF_3CH_2CH_2Si(Me)_3$, $CF_3CH_2CH_2SiCl_3$, $CF_3(CF_2)_5CH_2CH_2SiCl_3$, $CF_3(CF_2)_5CH_2CH_2Si(OMe)_3$, $CF_3(CF_2)_7CH_2CH_2SiCl_3$, $CF_3(CF_2)_7CH_2CH_2Si(OMe)_3$, $CF_3(CF_2)_7CH_2CH_2SiMeCl_2$, and $CF_3(CF_2)_7CH_2CH_2SiMe(OMe)_2$.

13. A method according to claim 1, wherein said alkylsilane compound is selected from the group consisting of $SiC_6H_{15}Cl$, $SiC_3H_8Cl_2$, $SiC_4H_9Cl_3$, $SiC_4H_{10}Cl_2$, $SiC_{12}H_{10}Cl_2$, $SiC_{16}H_{20}O_2$, $SiC_{14}H_{16}O_2$, $SiC_9H_{22}O_3$, $SiC_7H_{18}O_3$, $SiC_4H_{12}O_3$, $SiC_{13}H_{13}Cl$, $SiC_7H_8Cl_2$, $SiC_{20}H_{43}Cl$, $SiC_{19}H_{40}Cl$, $SiC_{21}H_{46}O_2$, $SiC_{18}H_{37}Cl_3$, $SiC_{24}H_{52}O_3$, $SiC_{21}H_{46}O_3$, $SiC_6H_{15}Cl_3$, $SiC_{12}H_{20}O_3$, $SiC_9H_{14}O_3$, $SiC_{18}H_{15}Cl$ and $SiC_9H_{21}Cl$.

14. A method according to claim 1, wherein said organic solvent is selected from the group consisting of a lower alcohol and an aromatic hydrocarbon.

15. A method according to claim 14, wherein said organic solvent comprises ethanol.

16. A method according to claim 1, wherein said fluoroalkylsilane compound is added and the gel film is heated at a temperature ranging from about 300° to 420° C.

17. A method according to claim 1, wherein said alkylsilane is added and the gel film is heated at a temperature ranging from about 150° to 170° C.

* * * * *